United States Patent
Suzuki (10) Patent No.: US 6,478,703 B2
(45) Date of Patent: Nov. 12, 2002

(54) RATCHET TENSIONER WITH BACKLASH

(75) Inventor: Tadasu Suzuki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 13 days.

(21) Appl. No.: 09/775,968

(22) Filed: Feb. 2, 2001

(65) Prior Publication Data

US 2001/0011047 A1 Aug. 2, 2001

(30) Foreign Application Priority Data

Feb. 2, 2000 (JP) ........................................ 2000-025524

(51) Int. Cl.[7] .............................. F16H 7/08; F16H 7/22
(52) U.S. Cl. ...................... 474/101; 474/110; 474/109
(58) Field of Search ................................. 474/101, 109, 474/111, 110, 133, 113–117, 140, 136, 138

(56) References Cited

U.S. PATENT DOCUMENTS

| | | | | |
|---|---|---|---|---|
| 4,822,320 A | * | 4/1989 | Suzuki | 474/111 |
| 5,006,095 A | * | 4/1991 | Suzuki | 474/111 |
| 5,073,150 A | * | 12/1991 | Shimaya | 474/110 |
| 5,577,970 A | * | 11/1996 | Smith et al. | 474/110 |
| 6,059,678 A | * | 5/2000 | Suzuki | 474/101 |
| 6,062,999 A | * | 5/2000 | Suzuki et al. | 474/111 |
| 6,234,928 B1 | * | 5/2001 | Suzuki et al. | 474/101 |

FOREIGN PATENT DOCUMENTS

JP 719300 A * 1/1995

* cited by examiner

*Primary Examiner*—David A. Bucci
*Assistant Examiner*—Marcus Charles
(74) *Attorney, Agent, or Firm*—Dann, Dorfman, Herrell and Skillman; Henry H. Skillman (57) ABSTRACT

A ratchet tensioner has a plunger retractably mounted in a housing and urged by a spring in a direction to project outward from the housing, and a ratchet pawl pivotally mounted on the housing and having a first prong normally engaged with one of ratchet teeth formed on the plunger so as to prevent backward motion of the plunger. The ratchet pawl also has a second prong spaced a predetermined distance from the first prong in the backward direction of the plunger and engageable with a second rack tooth to release meshing engagement between the first prong and the rack tooth when the plunger is moved forward due to a slack of a timing chain used with the tensioner. In order to maintain a predetermined amount of backlash between the first prong and the rack teeth, the rack teeth have a height greater than a half pitch of the ratchet teeth.

3 Claims, 5 Drawing Sheets

RATCHET TENSIONER WITH BACKLASH

BACKGROUND OF THE INVENTION

1. Field of the Invention

The present invention relates to a ratchet tensioner with backlash used to provide an appropriate tension to a timing chain of a vehicle engine and the like.

2. Description of the Related Art

Figure 3:
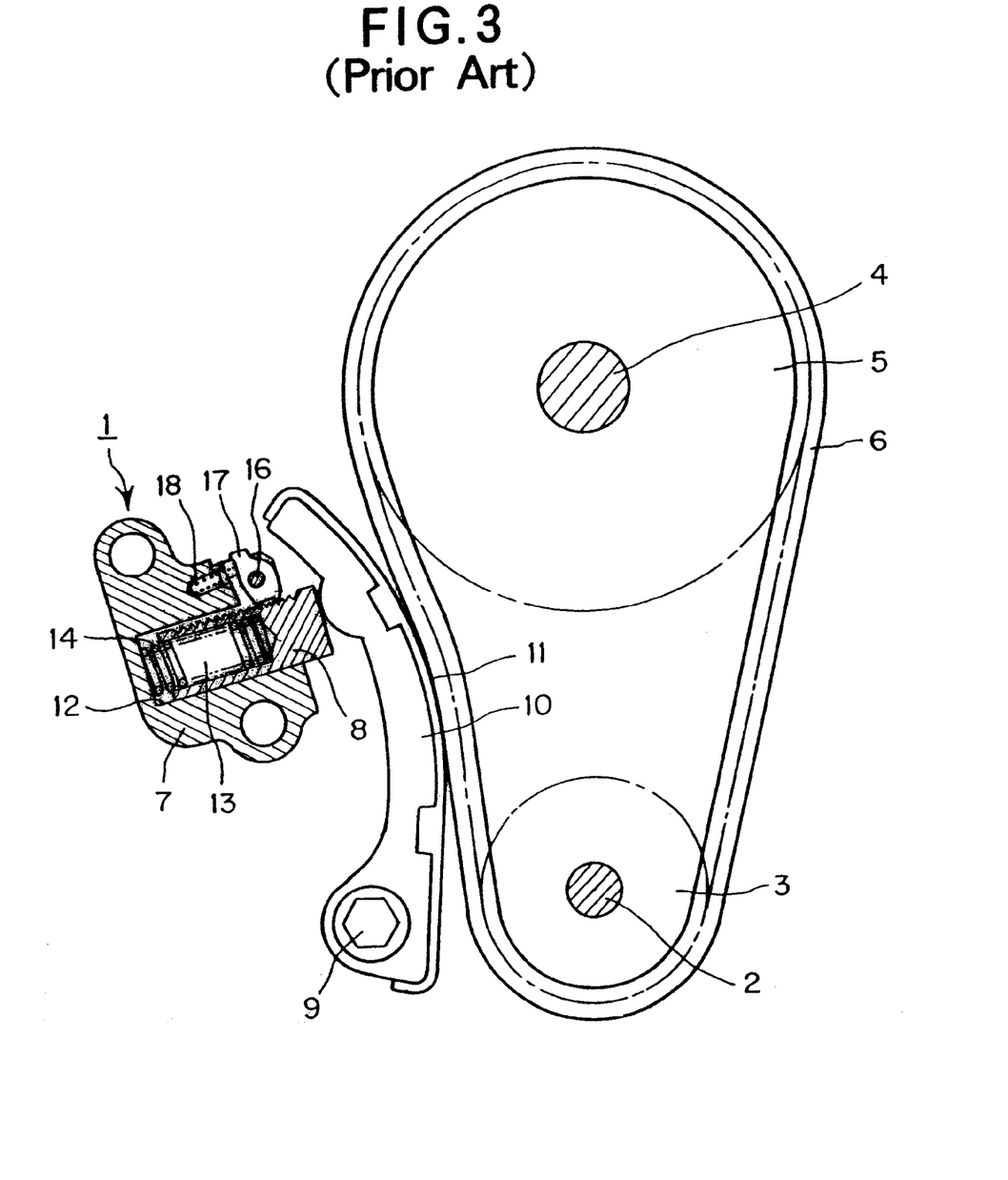
FIG. 3 is a schematic cross-sectional view of an example of use of the conventional ratchet tensioner with backlash.

In a chain drive for transmitting a rotating force between a crankshaft and a camshaft of a car engine, a ratchet tensioner having backlash as shown in FIG. 3 has been widely used for applying an appropriate tension to the slack side of a timing chain, thereby suppressing vibrations generated during travel of the timing chain.

FIG. 3 shows in cross section an example of use of the conventional ratchet tensioner having backlash. In FIG. 3, the ratchet tensioner 1 with backlash (hereinafter, simply referred to as "tensioner") is attached to an engine body on the slack side of a timing chain 6 stretching over a driving sprocket 3 rotated with the crankshaft 2 and a driven sprocket 5 fixed to the camshaft 4.

The tensioner 1 has a plunger 8 retractably projecting from a front surface of a tensioner housing 7. The plunger 8 has a front end held in pressure contact with a back surface in the vicinity of the distal or free end of a tensioner lever 10 pivotally mounted on the engine body by means of a support shaft 9, so that a shoe surface 11 of the tensioner lever 10 is held in slide contact with the slack side of the timing chain 6 to thereby provide a tension to the timing chain 6.

The tensioner housing 7 has a plunger-accommodating hole 12 formed therein for slidably receiving therein the plunger 8. The plunger 8 has a hollow section 13 formed therein, and the hollow section 13 one end opening to an end face of the plunger 8 opposite to the bottom of the plunger-accommodating hole 12. A plunger spring 14 comprised of a compression coil spring is disposed, in a loaded or otherwise compressed state, between the bottom of the plunger-accommodating hole 12 and the bottom of the hollow section 13, so that the plunger spring 14 normally urges the plunger 8 in a direction to project outward from the housing 7, this direction being hereinafter referred to as "projecting direction".

Figures 4, 4A:
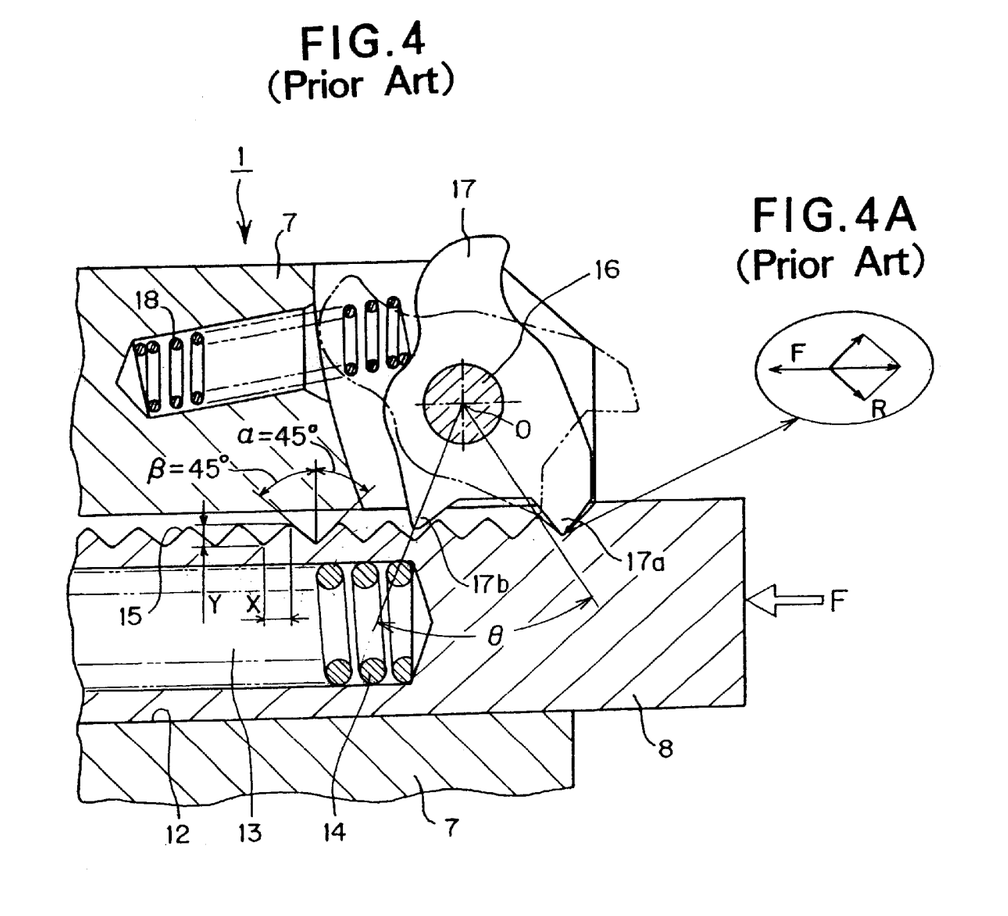
FIG. 4 is a partially enlarged cross-sectional view of the tensioner shown in FIG. 3.
FIG. 4A is a vector diagram showing components of force exerted on the tip of a first prong of the ratchet pawl when a plunger moves backward by the action of a backward force.

FIG. 4 is a partially enlarged cross-sectional view of the tensioner 1 shown in FIG. 3. As shown in FIG. 4, a series of rack teeth 15 are formed on a circumferential surface of the plunger 8 along one side of the plunger 8. The rack teeth 15 are spaced at equal pitch, and the total length of the rack teeth 15 is set in accordance with an expected slack of the timing chain 6. The rack teeth 15 are formed such that the rack angle α at the forward side of the plunger 8 and the rack angle β at the backward side of the plunger 8 are both 45. Also, as shown in FIG. 4, Y represents the height of the rack teeth 15, and X represents half pitch of the rack teeth 15. The term "rack angle α at the forward side of the plunger 8" used herein is intended to refer to an angle formed at the bottom of each tooth space between a line perpendicular to the axis of the plunger 8 and a flank of the rack tooth 15 located on the forward side of the perpendicular line. Similarly, the term "rack angle β at the backward side of the plunger 8" used herein is intended to refer to an angle formed at bottom of the same tooth space between the perpendicular line and a flank of the rack tooth 15 located on the backward side of the perpendicular line.

As shown in FIG. 4, a ratchet pawl 17 is pivoted by a shaft 16 to the tensioner housing 7 at a position opposite to the rack tooth 15. The ratchet pawl 17 is always urged in the clockwise direction by the force of a ratchet spring 18 acting between the ratchet pawl 17 and the tensioner housing 7. The ratchet pawl 17 has a first prong 17a formed on a lower edge thereof for meshing engagement with the rack teeth 15 to prevent the plunger 8 from moving in the backward direction, and a second prong 17b formed on the lower edge of the ratchet pawl 17 and spaced backward from the first prong 17a by a predetermined distance for releasing engagement of the first prong 17a and the rack teeth 15 when the plunger 8 moves in projecting direction by the force of the plunger spring 14. first prong 17a has a triangle shape corresponding to the tooth shape of the rack 15 at the front end of the lower edge of the ratchet pawl 17, so that the first prong 17a can be closely fit with a pair of rack teeth 15 without a gap. The second prong 17b is smaller in height than the first prong 17a and is spaced backward from the first prong 17a by a distance of three rack tooth pitches, for example. When the first prong 17a is closely fit in a tooth space of the rack teeth 15, the second prong 17b is in the non-contact or separated state at a position spaced from the first prong 17a by a predetermined distance. The second prong 18b, unlike the first prong 17a, is not designed to mesh with the rack teeth 15 for preventing movement of the plunger 8, but operative to engage a rack tooth 15 when the plunger 8 starts to move.

In FIG. 4, θ represents a angle of rotation of the second prong 17b achieved about the center O of rotation when the second prong 17b moves from a first position (indicated by the solid line in FIG. 4) in which the first prong 17a closely fits in a tooth space of the rack teeth 15 of the plunger 8, and a second position (indicated by the phantom lines in FIG. 4) in which the second prong 17b is released from engagement with a rack tooth 15 after having been urged in the counterclockwise direction by the forward movement of the plunger 8.

FIG. 4A shows a vector diagram of the force acting on the tip of the first prong 17a when the first prong 17a re-engages a rack tooth 15 to prevent backward motion of the plunger which would otherwise occur when the plunger 8 is subjected to a force F acting in the backward direction of the plunger 8.

The amount of backlash of the tensioner 1 shown in FIG. 4 is the amount of backward movement of the plunger 8 occurring when the plunger 8, which has been fully projected by the force of the plunger spring 14 due to a decrease in the tension on the timing chain 6 immediately before the disengagement of the second prong 17b from the rack tooth 15, moves backward by the action of a backward force F, thereby allowing the first prong 17a to come back into engagement with a rack tooth. The backlash amount is determined by the rotating angle θ of the second prong 17b.

Tensioners for use with a timing chain of an engine are required to have a small pitch of the rack teeth and a large amount of backlash. The small rack teeth pitch enables continuous tensioning of the timing chain, and the large backlash amount is able to prevent undue tensioning of the chain which may occur due to the difference in thermal expansion coefficient between the chain and the engine when the chain is made of steel and the engine is made of aluminum alloy.

Figure 5:
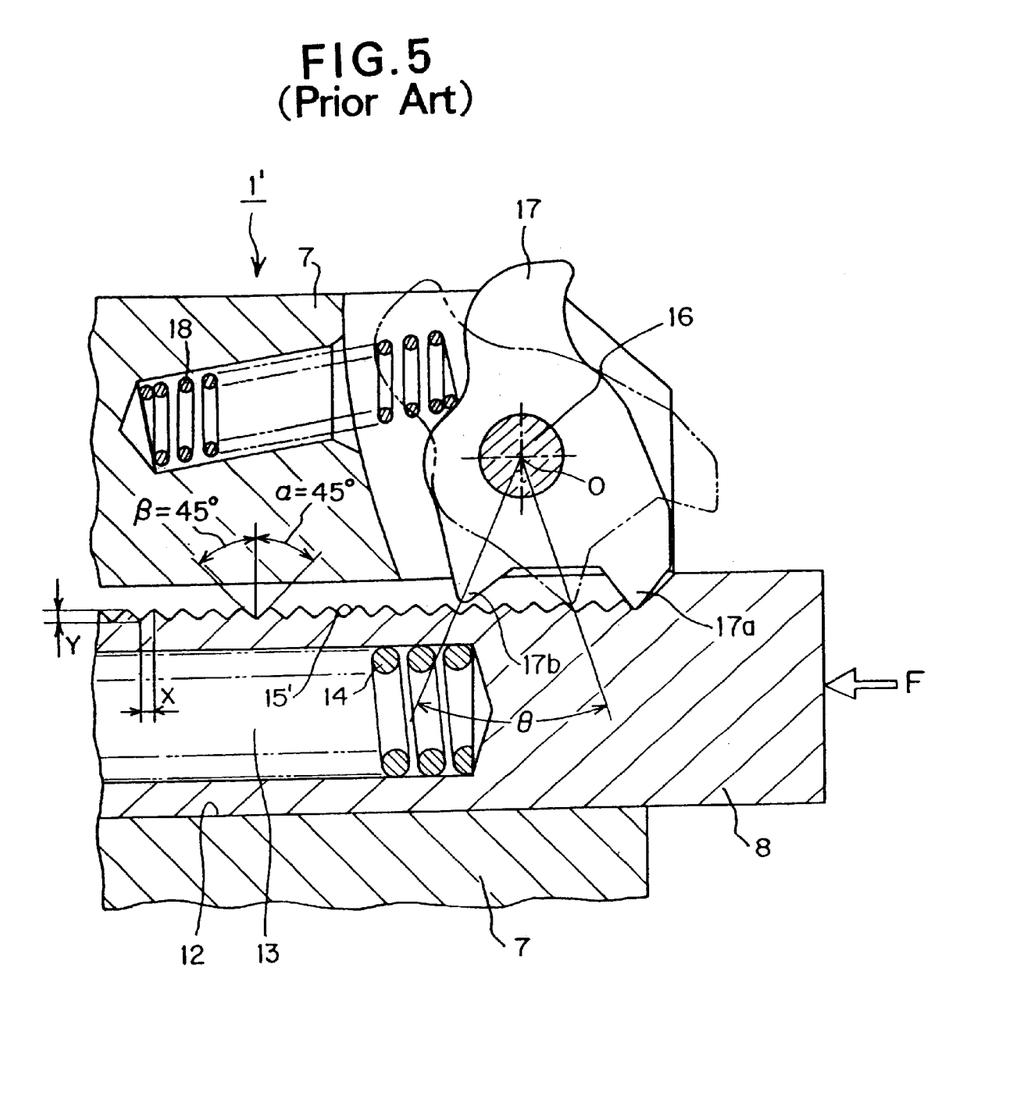
FIG. 5 is a similar to FIG. 4, but showing another conventional ratchet tensioner having rack teeth with reduced pitch.

To deal with this problem, the rack teeth pitch shown in FIG. 4 is made small, as shown in FIG. 5. In a ratchet tensioner 1' shown in FIG. 5, the pitch of the rack teeth 15' is reduced, and the rack angle α at the forward side of the plunger 8 and the rack angle β at the backward side of the plunger 8 are both 45. The tensioner 1' shown in FIG. 5 is the same as the tensioner 1 shown in FIG. 4, except that the rack teeth pitch is reduced. Accordingly, the like or corresponding parts are designated by the same reference characters, and a further description will be omitted.

However, because in the tensioner 1' shown in FIG. 5, the pitch of the rack teeth 15' is reduced while the rack angle α at the forward side of the plunger 8 and the rack angle β at the backward side of the plunger 8 are both kept equal to 45, the height Y of the rack teeth 15' is relatively lowered, so that the rotating angle θ' is smaller than the rotating angle α shown in FIG. 4. As a result, there is a problem that in the tensioner 1' shown in FIG. 5, the pitch of the rack teeth 15' can be reduced, but the backlash amount is also reduced.

SUMMARY OF THE INVENTION

Accordingly, a general object of the present invention is to solve the aforementioned conventional problems.

A more specific object of the present invention is to provide a tensioner with a ratchet mechanism having a relatively small rack tooth pitch and a sufficiently large amount of backlash.

According to a first aspect of the present invention, there is provided a ratchet tensioner with a backlash, comprising: a housing having a plunger-accommodating hole formed therein; a plunger slidably received in the plunger-accommodating hole with one end portion projecting outward from the housing; a plunger spring acting between the housing and the plunger and urging the plunger in a first direction to project from the housing; rack teeth formed on an outer circumferential surface of the plunger along the axis of the plunger; a ratchet pawl pivotally mounted to the housing, the ratchet pawl having a first prong adapted to mesh with one of the rack teeth to prevent the plunger from moving in a second direction opposite to the first direction, and a second prong spaced a predetermined distance from the first prong in the second direction and engageable with a second tooth of the rack teeth to release meshing engagement between the first prong and the rack teeth when the plunger moves in the first direction; and a ratchet spring acting between the housing and the ratchet pawl and urging the ratchet pawl to turn in a direction to keep the meshing engagement between the first prong and the rack teeth. The rack teeth have a height greater than a half pitch of the rack teeth.

In one preferred form, the rack teeth each have a first flank facing toward the first direction and a second flank facing toward the second direction. The first flank is inclined at a first rack angle relative to a line perpendicular to the axis of the plunger on the bottom of a tooth space defined between each pair of adjacent rack teeth; and the second flank is inclined at a second rack angle relative to the line perpendicular to the axis of the plunger on the bottom of the tooth space. The first rack angle is equal to the second rack angle. Preferably, the first and second rack angles are 37°.

In another form of the present invention, the second rack angle is larger than the first rack angle. Preferably, the first rack angle is 20° and the second rack angles is 45°.

According to a second aspect of the present invention, there is provided a ratchet tensioner with a backlash, comprising: a housing having a plunger-accommodating hole formed therein; a plunger slidably received in the plunger-accommodating hole with one end portion projecting outward from the housing; a plunger spring acting between the housing and the plunger and urging the plunger in a first direction to project from the housing; rack teeth formed on an outer circumferential surface of the plunger along the axis of the plunger; a ratchet pawl pivotally mounted to the housing, the ratchet pawl having a first prong adapted to mesh with one of the rack teeth to prevent the plunger from moving in a second direction opposite to the first direction, and a second prong spaced a predetermined distance from the first prong in the second direction and engageable with a second tooth of the rack teeth to release meshing engagement between the first prong and the rack teeth when the plunger moves in the first direction; and a ratchet spring acting between the housing and the ratchet pawl and urging the ratchet pawl to turn in a direction to keep the meshing engagement between the first prong and the rack teeth. The rack teeth each have a first flank facing toward the first direction and a second flank facing toward the second direction. The first flank is inclined at a first rack angle relative to a line perpendicular to the axis of the plunger on the bottom of a tooth space defined between each pair of adjacent rack teeth, and the second flank is inclined at a second rack angle relative to the line perpendicular to the axis of the plunger on the bottom of the tooth space. The second rack angle is larger than the first rack angle. Preferably, the first rack angle is 20° and the second rack angles is 45°. The rack teeth preferably have a height greater than a half pitch of the rack teeth.

In operation of the tensioner, the plunger urged in a direction to project outward from the housing applies an appropriate tension to the slack side of a chain to thereby eliminate a slack or vibrations of the chain while running. The plunger has a backlash defined by a distance between a first position in which the first prong of the ratchet is in mesh with one of the ratchet teeth to prevent backward motion of the plunger, and a second position in which the first prong is in mesh with the next rack tooth located immediately behind the rack tooth previously engaged with the first prong. Within a range of the backlash, the plunger is allowed to move in the forward and backward directions relative to the housing so as to accommodate changes in tension of the chain.

During that time the second prong of the ratchet pawl is spaced from the rack teeth. When the plunger slightly advances from the first position in which the first prong is in mesh with one rack tooth to prevent backward motion of the plunger, another rack tooth engages the second prong and forces the second prong in the forward direction to turn the racket pawl in a direction to release interlocking or otherwise meshing engagement between the first prong and the rack tooth.

Within a range in which the second prong is held in engagement with the rack tooth, the racket pawl is allowed to turn in the opposite direction to restore the meshing engagement between the first prong and the rack tooth when the plunger is moved backward against the force of the plunger spring due to an increase in the chain tension.

Due to a wear elongation of the chain, the plunger may advance beyond the backlash. In this instance, the second prong separates from the rack tooth, allowing the racket pawl to turn in the opposite direction, so that the first prong comes into meshing engagement with the next rack tooth located just behind the rack tooth previously engaged with the first prong.

In the tensioner of the present invention, the rack teeth have a height larger than a half pitch of the rack teeth, or a rack angle of the rack teeth at a backward side of the plunger is smaller than a rack angle of the rack teeth at a forward side of the plunger. With this arrangement, the height of the rack teeth is not reduced even when the pitch of the rack teeth is reduced. This means that the predetermined amount of backlash can be maintained.

The rack angle at the forward side of the plunger is made larger than the rack angle at the backward side of the plunger, the rack teeth are able to withstand a greater component force applied when the plunger is subjected to a force tending to retract the plunger.

BRIEF DESCRIPTION OF THE DRAWINGS

The above objects, other objects, features and advantages of the present invention will be better understood from the following description taken in conjunction with the accompanying drawings, in which.

DETAILED DESCRIPTION OF THE PREFERRED EMBODIMENTS

Figures 1, 1A:
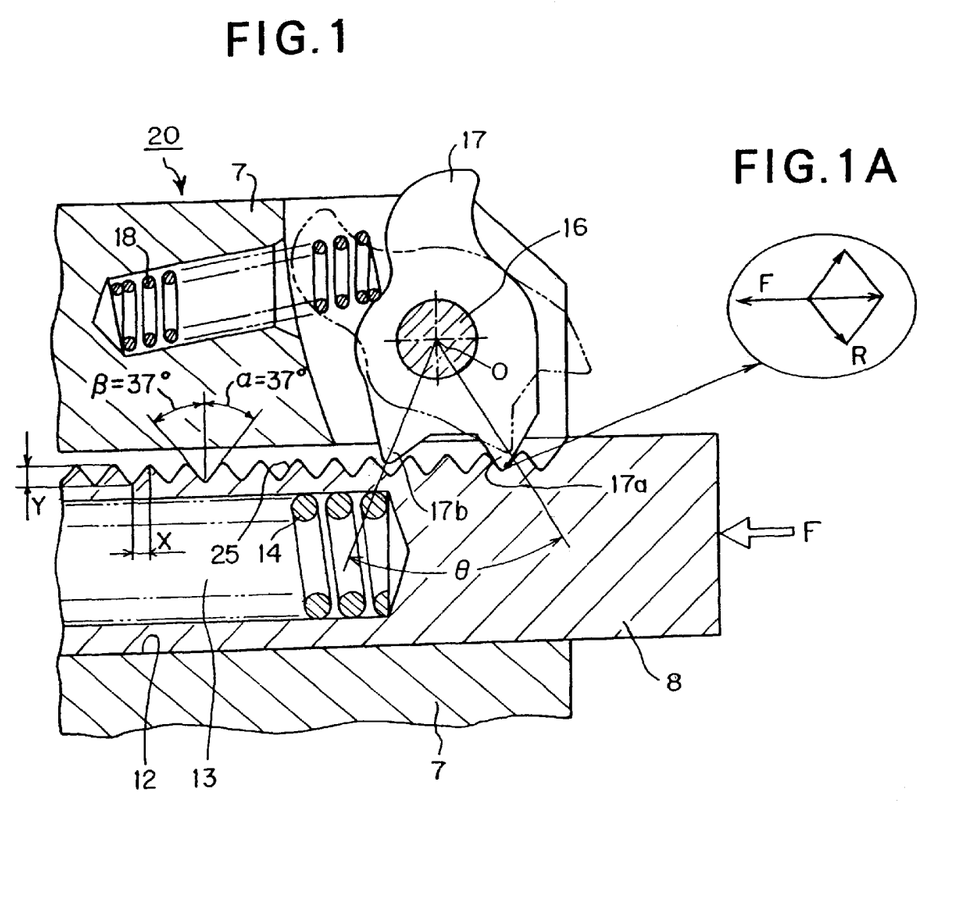
FIG. 1 is a partially enlarged cross-sectional view showing a main part of a ratchet tensioner with backlash according to an embodiment of the present invention.
FIG. 1A is a vector diagram showing components of force exerted on the tip of a first prong of the ratchet pawl when a plunger moves backward by the action of a backward force.

Certain preferred embodiments of the present invention will be described with reference to the accompanying sheets of drawing. Referring now to FIG. 1, there is shown, in cross section, a main part of a ratchet tensioner with backlash according to a first embodiment of the present invention.

The ratchet tensioner 20 (hereinafter, referred to as "tensioner") is structurally and functionally the same as the tensioner 1 shown in FIG. 4, except for the shape and configuration of rack teeth 25 formed on the peripheral surface of a plunger 8. Therefore, except for the rack teeth 25, the same parts are designated by the same reference characters, and explanation thereof will be omitted.

As shown in FIG. 1, the rack teeth 25 of the tensioner 20 each have a rack angle α at a forward side of the plunger 8 and a rack angle β at a backward side of the plunger. In the illustrated embodiment, the rack angles α, β are both 37. It appears that the rack angles α, β are made smaller than the rack angle α(=45) at a forward side of the plunger and the rack angle β(=45) at a backward side of the plunger shown in FIG. 5, so that the height Y of the rack teeth 25 is larger than a half pitch X of the rack teeth 25. Therefore, even when pitch of the rack teeth 25 is reduced, the tooth height Y of the rack teeth 25 is not reduced at all. The rotating angle θ of the second prong 17b of the tensioner 20 does not get small such as the rotating angle θ' of the second prong 17b as shown in FIG. 5, and as a result, the backlash amount does not get smaller.

The tensioner 20 shown in FIG. 1 operates as follows. The plunger 8 urged by a plunger spring 14 in a direction to project outward from a tensioner housing 7 applies an appropriate tension to the slack side of a timing chain 6 (see FIG. 3) so as to prevent a slack and vibrations of the timing chain 6 from occurring during travel of the timing chain 6. The plunger 8 is movable back and forth relative to the plunger housing 7 in accordance with changes in tension in the timing chain 6 by the amount of backlash corresponding to a distance between a first position in which a first prong 17a of a ratchet pawl 17 engages with one tooth of the rack teeth 25 to prevent backward motion of the plunger 8, and a second position in which the first prong 17a engages with the next rack tooth which is immediately behind the previously engaged rack tooth.

During that time, when the plunger 8 slightly advances, one rack tooth 25 first engages a second prong 17b of the ratchet pawl 17 and subsequently forces the second prong 17b in the forward direction. The forward movement of the second prong 17b turns the ratchet pawl 17 in the counterclockwise direction in FIG. 1, thereby disengage the first prong 17a from the rack tooth 15.

In an operating range of the second prong 17b in which the second prong 17b is held in engagement with the rack tooth 25 (that is, in a range of the rotating angle θ of the second prong 17b), when the plunger 8 is retracted against the force of the plunger spring 14 due to an increased tension in the timing chain 6, the ratchet pawl 17 is allowed to turn in the clockwise direction to restore meshing engagement between the first prong 17a and the rack tooth 25.

During that time, advancing movement of the plunger 8 releases engagement of the first prong 17a with the rack tooth 25 and the second prong 17b is urged by the rack tooth 25 to turn through an angle of θ, so that the predetermined amount of backlash of the plunger 8 is maintained.

On the other hand, when the plunger 8 advances beyond the amount of backlash due to wear expansion of the timing chain 6 (that is, when the second prong 17b is urged by the rack tooth 25 to turn counterclockwise in FIG. 1 beyond the rotating angle θ), the second prong 17b is released from interlocking engagement with the rack tooth 25 engaging with the second prong 17b, whereupon the ratchet pawl 17 turns clockwise by the force of the ratchet spring 18, thereby bringing the first prong 17a into engagement with the next rack tooth 25 which is located immediately behind the previously engaged rack tooth. With this engagement of the first prong 17a and the rack tooth 25, backward movement of the plunger 8 alone can be prevented.

Operation described above is essentially the same as that of the conventional tensioners 1, 1'. However, in the tensioner 20 according to the foregoing embodiment of the present invention, since the height Y of the rack teeth 25 is made greater than half pitch X of the rack 25, the rack tooth height Y is not reduced even when pitch of the rack teeth 25 is reduced. This means that the rotating angle θ of the second prong 17b is not reduced and, hence, the predetermined amount of backlash can be maintained.

In the tensioner 20 shown in FIG. 1, since the rack angle α is 37, the flank of one rack tooth 25 which is in mesh the first prong 17a on the forward side of the plunger 8 is subjected to a relatively large component R of force when a backward force F is applied to the plunger 8. The large component force R may deteriorate the durability of the rack teeth 25.

Figures 2, 2A:
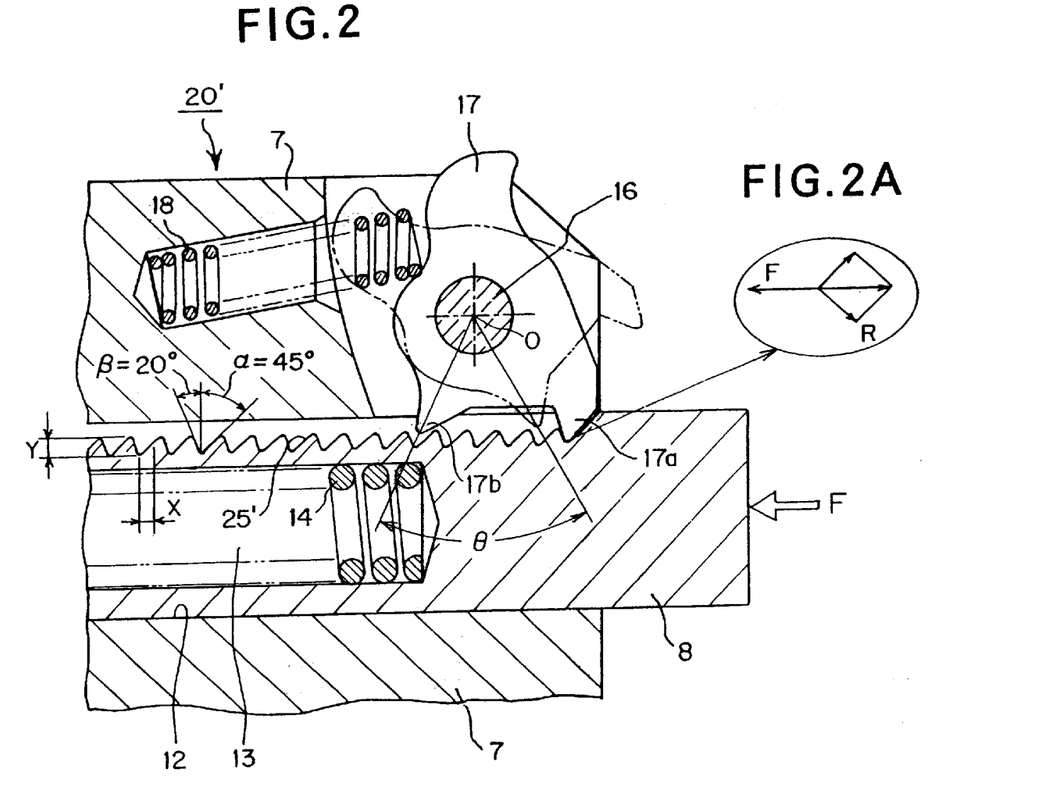
FIG. 2 is a partially enlarged cross-sectional view showing a main part of a ratchet tensioner with backlash according to another embodiment of the present invention.
FIG. 2A is a vector diagram showing components of force exerted on the tip of a first prong of the ratchet pawl when a plunger moves backward by the action of a backward force.

FIG. 2 is a view similar to FIG. 1, but showing a ratchet tensioner with backlash according to a second embodiment of the present invention. The tensioner 20' is substantially the same in construction and function as the tensioner 1 shown in FIG. 1, except for the shape and configuration of rack teeth 25' formed on the peripheral surface of a plunger 8. Thus, except for the rack 25', the same or corresponding parts are designated by the same reference characters as those used in FIG. 1 and further explanation thereof will be omitted.

As shown in FIG. 2, the rack teeth 25' of the tensioner 20' each have a rack angle α at a forward side of the plunger 8, which is different from a rack angle β at a backward side of the plunger 8. Especially, the rack angle is set at 45, and the rack angle θ is set at 20. With this arrangement, the pitch of the rack teeth 25' can be reduced while maintaining the same height Y of the rack teeth 25' as that of the rack teeth 25 shown in FIG. 1. Since the rack tooth height Y is maintained even though the rack tooth pitch is reduced, the predetermined rotating angle θ of the second prong 17b of a ratchet pawl 17 can be maintained without being reduced as in the case of the rotating angle θ' of the second prong 17b shown in FIG. 5. Thus, the predetermined amount of backlash of the tensioner 20' is maintained.

The tensioner 20' shown in FIG. 2 is superior to the tensioner 20 of FIG. 1 in terms of the durability of the rack teeth. The flank of one rack tooth 25' which is in mesh the first prong 17a on the forward side of the plunger 8 is subjected to a component R of force (FIG. 2A) when a backward force F is applied to the plunger 8. The large component force R is smaller than the component force R shown in FIG. 1A. This is because the rack angle α of the rack teeth 25' at a forward side of the plunger 8 is 45 and made greater than that of the rack teeth 25 shown in FIG. 1. The rack angle β of the rack teeth 25' at a backward side of the plunger 8 is 20. By virtue of the large rack angle α at the forward side of the plunger 8, the rack teeth 25' have an improved degree of durability.

The tensioner 20' shown in FIG. 2 operates essentially in the same manner as the tensioner 20 of FIG. 1, and no further explanation thereof is needed.

Also, in the tensioners 20, 20' shown in FIGS. 1 and 2, the plunger spring 14 urging the plunger 8 in the projecting direction is mounted in the hollow section 13 of the plunger 8 in a loaded or compressed state. However, the present invention can be applied to a hydraulic tensioner in which oil is supplied from the engine to a space formed by a plunger-accommodating hole and a hollow section of the plunger, in addition to the plunger spring urging the plunger in the projecting direction.

In the embodiments shown in FIGS. 1 and 2, the tensioner 20, 20' is used with a timing chain 6 of an engine. The tensioner of the present invention can be used with other types of chains than the timing chain.

As described above, according to the present invention, the pitch of the rack teeth can be reduced while maintaining the desired durability of rack teeth and the predetermined amount of backlash within a limited space. The tensioner having such a small rack tooth pitch and a sufficiently large amount of backlash is particularly suitable for use with a timing chain of an engine. The tensioner does not require an enlarged space for installation thereof and hence is able to replace the existing tensioner.

Obviously, various minor changes and modifications of the present invention are possible in the light of the above teaching. It is therefore to be understood that within the scope of the appended claims, the present invention may be practiced otherwise than as specifically described.

What is claimed is:

1. A ratchet tensioner with a backlash, comprising:

a housing having a plunger-accommodating hole formed therein;

a plunger slidably received in the plunger-accommodating hole with one end portion projecting outward from the housing;

a plunger spring acting between the housing and the plunger and urging the plunger in a first direction to project from the housing;

rack teeth formed on an outer circumferential surface of the plunger along the axis of the plunger;

a ratchet pawl pivotally mounted to the housing, the ratchet pawl having a first prong adapted to mesh with one of the rack teeth to prevent the plunger from moving in a second direction opposite to the first direction, and a second prong spaced a predetermined distance from the first prong in the second direction and engageable with a second tooth of the rack teeth to release meshing engagement between the first prong and the rack teeth when the plunger moves in the first direction; and a ratchet spring acting between the housing and the ratchet pawl and urging the ratchet pawl to turn in a direction to keep the meshing engagement between the first prong and the rack teeth, wherein the rack teeth have a height greater than a half pitch of the rack teeth, each of said rack teeth having a first flank facing toward the first direction and a second flank facing toward the second direction, the first flank being inclined at a first rack angle of 20° relative to a line perpendicular to the axis of the plunger on the bottom of a tooth space defined between each pair of adjacent rack teeth, the second flank being inclined at a second rack angle of 45° relative to a line perpendicular to the axis of the plunger on the bottom of the tooth space.

2. A ratchet tensioner with a backlash, comprising:

a housing having a plunger-accommodating hole formed therein;

a plunger slidably received in the plunger-accommodating hole with one end portion projecting outward from the housing;

a plunger spring acting between the housing and the plunger and urging the plunger in a first direction to project from the housing;

rack teeth formed on an outer circumferential surface of the plunger along the axis of the plunger;

a ratchet pawl pivotally mounted to the housing, the ratchet pawl having a first prong adapted to mesh with one of the rack teeth to prevent the plunger from moving in a second direction opposite to the first direction, and a second prong spaced a predetermined distance from the first prong in the second direction and engageable with a second tooth of the rack teeth to release meshing engagement between the first prong and the rack teeth when the plunger moves in the first direction; and a ratchet spring acting between the housing and the ratchet pawl and urging the ratchet pawl to turn in a direction to keep the meshing engagement between the first prong and the rack teeth, wherein the rack teeth each have a first flank facing toward the first direction and a second flank facing toward the second direction, the first flank being inclined at a first rack angle of 20° relative to a line perpendicular to the axis of the plunger on the bottom of a tooth space defined between each pair of adjacent rack teeth, the second flank being inclined at a second rack angle of 45° relative to a line perpendicular to the axis of the plunger on the bottom of the tooth space.

3. A ratchet tensioner according to claim 2, wherein the rack teeth have a height greater than a half pitch of the rack teeth.

* * * * *

UNITED STATES PATENT AND TRADEMARK OFFICE
CERTIFICATE OF CORRECTION

PATENT NO. : 6,478,703 B2
DATED : November 12, 2002
INVENTOR(S) : Suzuki

It is certified that error appears in the above-identified patent and that said Letters Patent is hereby corrected as shown below:

Column 2,
Line 14, before "first" insert -- The --;

Column 3,
Line 13, "angle $\alpha$" should be -- angle $\theta$ --;

Column 7,
Line 20, "angle $\theta$" should be -- angle $\beta$ --.

Signed and Sealed this

Fourth Day of November, 2003

JAMES E. ROGAN
*Director of the United States Patent and Trademark Office*